(12) United States Patent
Mashiko

(10) Patent No.: US 10,095,447 B2
(45) Date of Patent: Oct. 9, 2018

(54) INFORMATION PROCESSING APPARATUS, INFORMATION PROCESSING SYSTEM, AND INFORMATION PROCESSING METHOD

(71) Applicant: Yohta Mashiko, Kanagawa (JP)

(72) Inventor: Yohta Mashiko, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1 day.

(21) Appl. No.: 15/584,175

(22) Filed: May 2, 2017

(65) Prior Publication Data

US 2017/0351464 A1    Dec. 7, 2017

(30) Foreign Application Priority Data

Jun. 2, 2016    (JP) .................................. 2016-110964

(51) Int. Cl.
G06F 3/12    (2006.01)
G06F 17/30    (2006.01)

(52) U.S. Cl.
CPC .......... *G06F 3/1204* (2013.01); *G06F 3/1293* (2013.01); *G06F 3/1294* (2013.01); *G06F 3/1296* (2013.01); *G06F 3/1297* (2013.01); *G06F 17/30002* (2013.01)

(58) Field of Classification Search
CPC .................................................. G06F 3/1204
See application file for complete search history.

(56) References Cited

U.S. PATENT DOCUMENTS

| | | | |
|---|---|---|---|
| 7,880,920 B2 * | 2/2011 | Akashi | G03G 15/55 |
| | | | 358/1.13 |
| 2015/0015916 A1 * | 1/2015 | Kikuchi | G06K 15/1848 |
| | | | 358/3.24 |
| 2016/0274827 A1 * | 9/2016 | Kogusuri | G06F 3/1205 |

FOREIGN PATENT DOCUMENTS

| | | |
|---|---|---|
| JP | 2010-212954 | 9/2010 |
| JP | 4817933 | 11/2011 |
| JP | 2015-019306 | 1/2015 |

* cited by examiner

*Primary Examiner* — King Poon
*Assistant Examiner* — Michael Burleson
(74) *Attorney, Agent, or Firm* — IPUSA, PLLC

(57) ABSTRACT

An information processing apparatus includes a first print medium database storing first print medium data items indicating attributes of a print medium. The information processing apparatus is coupled to a printing device including a second print medium database storing second print medium data items. The information processing apparatus includes processing circuitry configured to determine whether the first and second print medium databases are synchronized with each other; determine whether the second print medium data items stored in the second print medium database are supported in the information processing apparatus, when the first and second print medium databases are determined as not being synchronized with each other; and delete the first print medium data items stored in the first print medium database, and store, in the first print medium database, a second print medium data item determined as being supported.

9 Claims, 11 Drawing Sheets

FIG.5

| No. | SHEET CLASS | SHEET SIZE (0.1 mm) |
|---|---|---|
| 1 | REGULAR SIZE A3 | 4200 x 2970 |
| 2 | REGULAR SIZE A4 | 2970 x 2100 |
| 3 | REGULAR SIZE A5 | 2100 x 1480 |
| 4 | REGULAR SIZE B4 | 3640 x 2570 |
| 5 | REGULAR SIZE B5 | 2570 x 1820 |
| 6 | REGULAR SIZE DLT | 4318 x 2794 |
| 7 | REGULAR SIZE LT | 2794 x 2159 |

| ID | SHEET CLASS | SHEET SIZE (0.1 mm) | SHEET TYPE | SHEET THICKNESS | ... |
|---|---|---|---|---|---|
| 1 | REGULAR SIZE A4 | 2970 x 2100 | PLAIN PAPER | SHEET THICKNESS 2 | ... |
| 2 | REGULAR SIZE A3 | 4200 x 2970 | PLAIN PAPER | SHEET THICKNESS 3 | ... |
| 3 | REGULAR SIZE B5 | 2570 x 1820 | COATED PAPER | SHEET THICKNESS 2 | ... |
| 4 | REGULAR SIZE A5 | 2100 x 1480 | PLAIN PAPER | SHEET THICKNESS 2 | ... |
| 5 |  |  |  |  | ... |
| ... | ... | ... | ... | ... | ... |
| N−1 |  |  |  |  | ... |
| N |  |  |  |  | ... |

| ID | SHEET CLASS | SHEET SIZE (0.1 mm) | SHEET TYPE | SHEET THICKNESS |
|---|---|---|---|---|
| 1 | REGULAR SIZE LT | 2794 × 2159 | PLAIN PAPER | SHEET THICKNESS 2 |
| 2 | REGULAR SIZE DLT | 4318 × 2794 | PLAIN PAPER | SHEET THICKNESS 3 |
| 3 | REGULAR SIZE C5 | 2290 × 1620 | PLAIN PAPER | SHEET THICKNESS 2 |
| 4 | | | | |
| 5 | ... | ... | ... | ... |
| ... | | | | |
| M−1 | | | | |
| M | | | | |

410

| ID | SHEET CLASS | SHEET SIZE (0.1 mm) | SHEET TYPE | SHEET THICKNESS | ... |
|---|---|---|---|---|---|
| 1 | REGULAR SIZE C5 | 2290 x 1620 | PLAIN PAPER | SHEET THICKNESS 2 | ... |
| ... | ... | ... | ... | ... | ... |

G200

WARNING

THE FOLLOWING NON-SUPPORTED SHEET IS REGISTERED.
- REGULAR SIZE C5

PLEASE CONFIRM SHEET DATABASE OF PRINTING DEVICE.

OK

INFORMATION PROCESSING APPARATUS, INFORMATION PROCESSING SYSTEM, AND INFORMATION PROCESSING METHOD

CROSS-REFERENCE TO RELATED APPLICATION

The present application claims priority under 35 U.S.C. § 119 to Japanese Patent Application No. 2016-110964, filed on Jun. 2, 2016, the contents of which are incorporated herein by reference in their entirety.

BACKGROUND OF THE INVENTION

1. Field of the Invention

The present invention relates to an information processing apparatus, an information processing system, and an information processing method.

2. Description of the Related Art

Sheets, which are used by image processing apparatuses such as a production printer, etc., have various attributes, such as a sheet size, a sheet type, a thickness, a color, and gloss, etc. There is known a technology in which a user sets values of these attributes of a sheet, and registers the values as sheet data in a sheet database and a paper catalogue, etc.

Here, there are cases where an image processing apparatus such as a production printer, etc., is formed by a control device for performing a Raster Image Processor (RIP) process, etc., and a printing device for performing a printing process. In these cases, the control device and the printing device synchronize their respective sheet databases with each other.

Furthermore, there is known a technology in which, when the control device or the printing device needs to be replaced in the image processing apparatus, the sheet data, which has been used by the control device or the printing device before being replaced, can be maintained in the control device or the printing device after replacement (see, for example, Patent Document 1).

Patent Document 1: Japanese Unexamined Patent Application Publication No. 4817933

SUMMARY OF THE INVENTION

An aspect of the present invention provides an information processing apparatus, an information processing system, and an information processing method in which one or more of the disadvantages of the related art are reduced.

According to one aspect of the present invention, there is provided an information processing apparatus including a first print medium database storing one or more first print medium data items indicating one or more attributes of a print medium, the information processing apparatus being coupled to a printing device including a second print medium database storing one or more second print medium data items, the information processing apparatus including processing circuitry configured to determine whether the first print medium database and the second print medium database are synchronized with each other, determine whether the one or more second print medium data items stored in the second print medium database are supported in the information processing apparatus, when the first print medium database and the second print medium database are determined as not being synchronized with each other, and delete the one or more first print medium data items stored in the first print medium database, and subsequently store, in the first print medium database, at least one of the second print medium data items that is determined as being supported in the information processing apparatus among the one or more second print medium data items stored in the second print medium database.

BRIEF DESCRIPTION OF THE DRAWINGS

Other objects, features and advantages of the present invention will become more apparent from the following detailed description when read in conjunction with the accompanying drawings, in which:

FIG. 5 illustrates an example of a supported regular size list according to an embodiment of the present invention;

FIG. 6 illustrates an example of a sheet database (DB) of the control device according to an embodiment of the present invention;

FIG. 7 illustrates an example of the sheet DB of the printing device according to an embodiment of the present invention;

DETAILED DESCRIPTION OF THE PREFERRED EMBODIMENTS

In the related art, for example, when sheet data of a sheet, which is not supported in the control device, is registered in the sheet database of the printing device, there have been cases where the control device and the printing device included in the image processing apparatus cannot synchronize their respective sheet data bases with each other. For this reason, there have been cases where the process of synchronizing the sheet databases between the control device and the printing device cannot be completed.

A problem to be solved by an embodiment of the present invention is to appropriately synchronize the print medium databases.

Embodiments of the present invention will be described by referring to the accompanying drawings.

<System Configuration>

Figure 1:
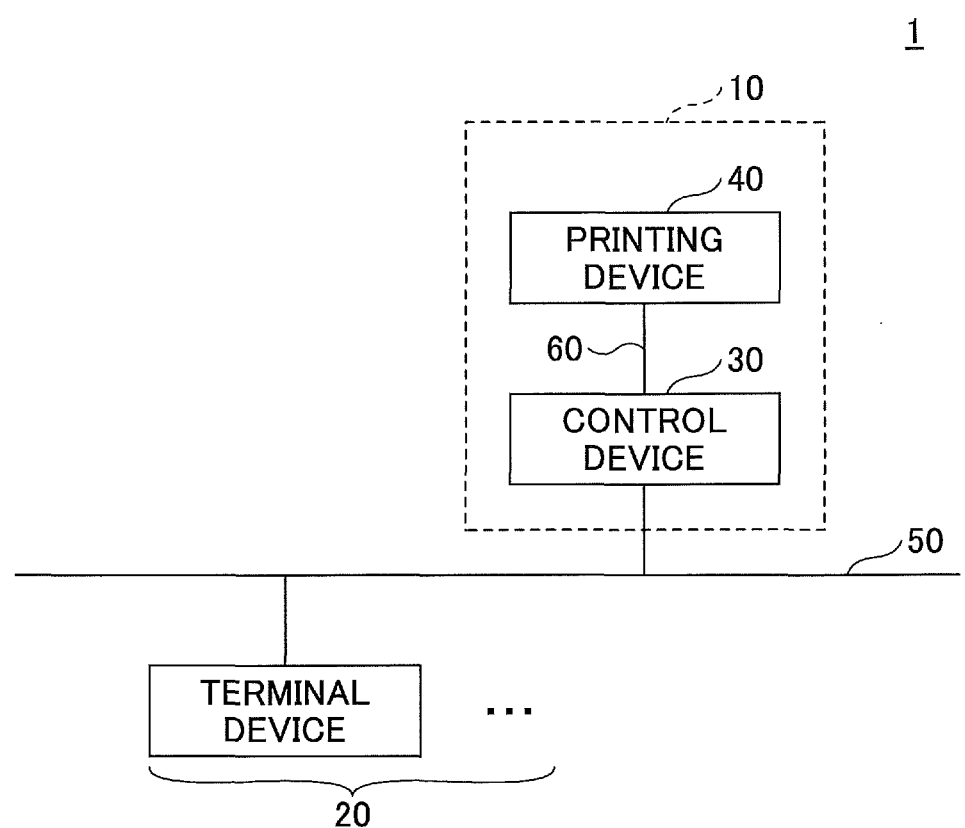
FIG. 1 illustrates a system configuration of a printing system according to an embodiment of the present invention.

First, a description is given of a system configuration of a printing system 1 according to the present embodiment by referring to FIG. 1. FIG. 1 illustrates a system configuration of the printing system 1 according to the present embodiment.

As illustrated in FIG. 1, the printing system 1 according to the present embodiment includes an image processing apparatus 10 and one or more terminal devices 20, which are communicatively coupled to each other via a network 50.

The image processing apparatus 10 is, for example, a production printer, etc., and includes a control device 30 and a printing device 40. Furthermore, the control device 30 and the printing device 40 are communicatively coupled to each other via an exclusive-use line 60.

The control device 30 is, for example, a Digital Front End (DFE), etc., and is an information processing apparatus for performing an RIP process. The control device 30 includes a sheet database (hereinafter, a data may also be expressed as "DB") for managing data (sheet data) relevant to the type of sheet registered by the user. Note that the control device 30 is also referred to as a "controller" and a "print controller".

The printing device 40 is, for example, a multifunction peripheral or a digital printer, etc., and is an image forming apparatus for executing a print job created by a RIP process, etc., by the control device 30, and printing data onto a print medium such as a sheet, etc. The printing device 40 includes a sheet DB for managing the sheet data that has been registered by a user. Note that the printing device 40 is also referred to as an "engine" and a "print engine".

Here, the image processing apparatus 10 according to the present embodiment synchronizes the sheet data stored in the sheet DB of the control device 30 and the sheet data stored in the sheet DB of the printing device 40 with each other, when the image processing apparatus 10 is activated. At this case, even when sheet data of a sheet, which is not supported in the control device 30, is registered in the sheet DB of the printing device 40, the image processing apparatus 10 according to the present embodiment can exclude this sheet data from the target of synchronization, to appropriately synchronize the respective sheet DBs with each other.

The terminal device 20 is an information processing apparatus used by the user, such as a notebook personal computer (PC), a desktop PC, a smartphone, a tablet terminal, and a mobile phone, etc. For example, the user uses the terminal device 20 to select the desired sheet data from the sheet DB of the control device 30 and give a print request to the control device 30, to print the desired electronic data on a print medium.

Note that the printing system 1 illustrated in FIG. 1 is one example; the printing system 1 may have other configurations. For example, the printing system 1 may not include the terminal device 20. Furthermore, for example, the printing system 1 may include a plurality of the image processing apparatuses 10.

<Hardware Configuration>

Figure 2:
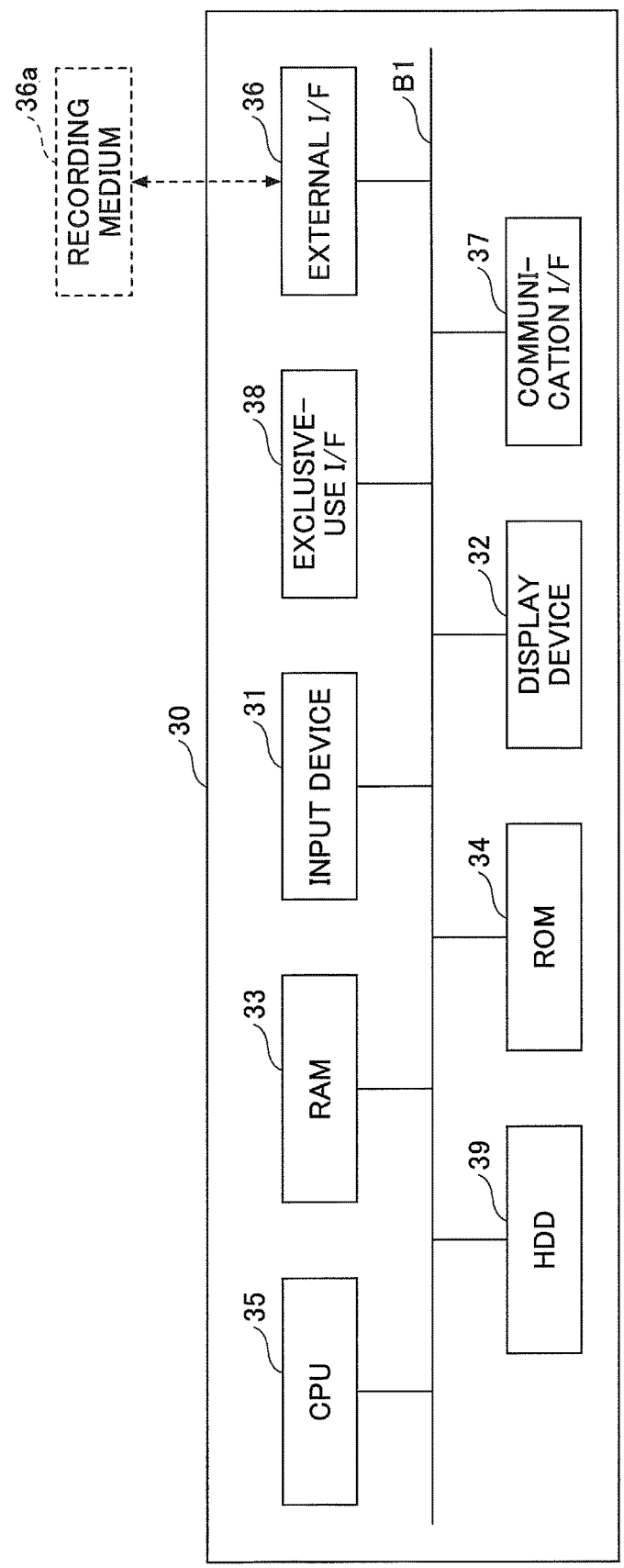
FIG. 2 illustrates a hardware configuration of an example of a control device according to an embodiment of the present invention.

Next, a description is given of a hardware configuration of the control device 30 according to the present embodiment, by referring to FIG. 2. FIG. 2 illustrates a hardware configuration of an example of the control device 30 according to the present embodiment.

As illustrated in FIG. 2, the control device 30 includes an input device 31, a display device 32, a random access memory (RAM) 33, a read-only memory (ROM) 34, and a central processing unit (CPU) 35. Furthermore, the control device 30 includes an external interface (I/F) 36, a communication interface (I/F) 37, an exclusive-use interface (I/F) 38, and a hard disk drive (HDD) 39. Furthermore, these hardware elements are coupled to each other by a bus B1.

The input device 31 includes a keyboard, a mouse, and a touch panel, etc., by which the user inputs various operation signals. The display device 32 includes a display, etc., to display various process results. At least one of the input device 31 and the display device 32 may be in a mode of being coupled to the bus B1 to be used according to need.

The RAM 33 is a volatile semiconductor memory configured to temporarily store programs and data. The ROM 34 is a non-volatile semiconductor memory that can store programs or data even when a power source is powered off. The CPU 35 is an arithmetic device that loads the programs and/or data from the ROM 34 and the HDD 39, etc., into the RAM 33, and executes various processes.

The external I/F 36 an interface between the control device 30 and an external device. The external device includes a recording medium 36a, such as a compact disk (CD), a digital versatile disc (DVD), a secure digital (SD) memory card, and a universal serial bus (USB) memory. The control device 30 can read information from the recording medium 36a and write information to the recording medium 36a via the external I/F 36.

The communication I/F 37 is an interface provided to couple the control device 30 with the network 50. Thus, the control device 30 can receive a print request, etc., from the terminal device 20, via the communication I/F 37.

The exclusive-use I/F 38 is an interface provided to couple the control device 30 with the exclusive-use line 60. Thus, the control device 30 can send and receive various kinds of data for synchronizing the sheet DB with the printing device 40, via the exclusive-use I/F 38.

The HDD 39 is a non-volatile memory device that stores programs and data. The programs and data stored in the HDD 39 are an operating system (OS), which is basic software controlling the entire control device 30, and various application programs operating in the OS, etc.

The control device 30 according to the present embodiment can realize various processes described below by having the above hardware configuration illustrated in FIG. 2. Note that the terminal device 20 has the same hardware configuration as that of the control device 30, except that the exclusive-use I/F 38 is not included.

Figure 3:
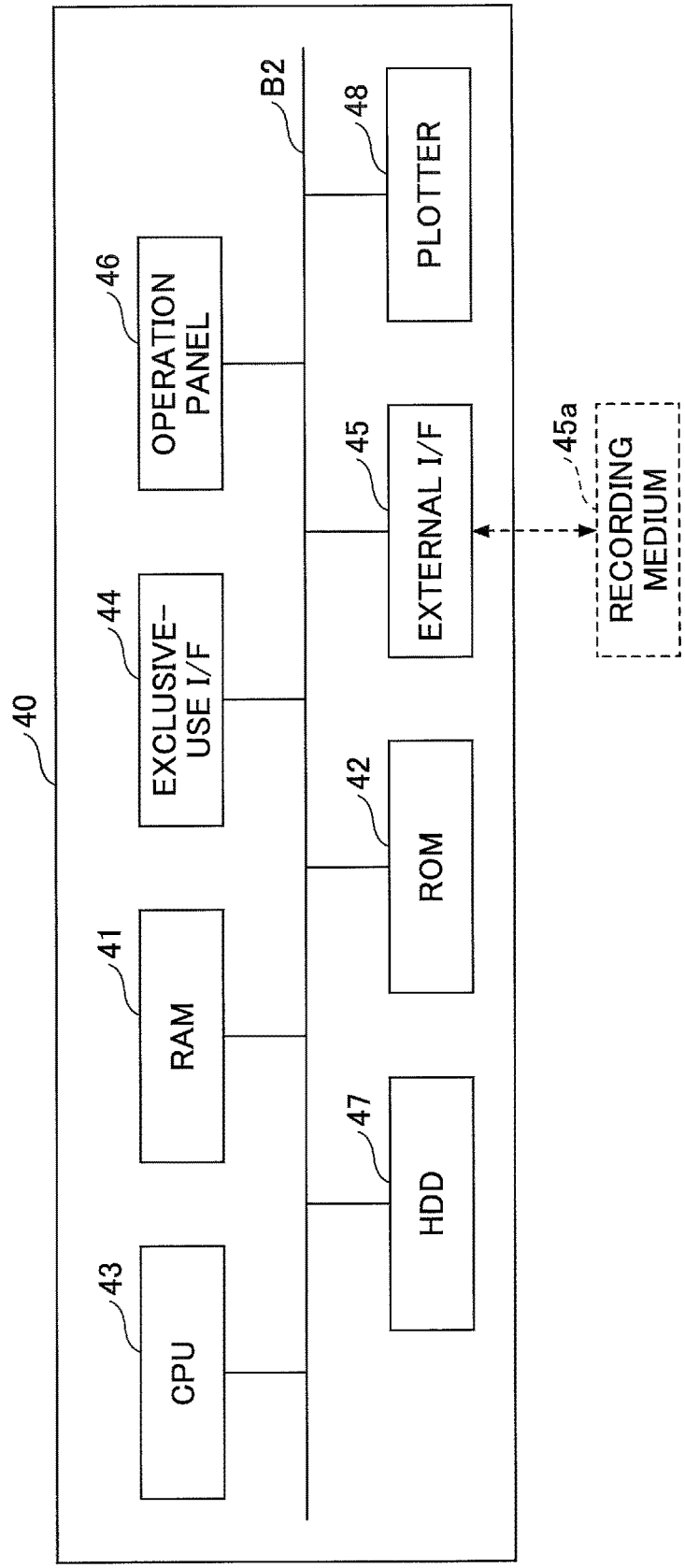
FIG. 3 illustrates an example of a hardware configuration of a printing device according to an embodiment of the present invention.

Next, a description is given of a hardware configuration of the printing device 40 according to the present embodiment, by referring to FIG. 3. FIG. 3 illustrates an example of a hardware configuration of the printing device 40 according to the present embodiment.

As illustrated in FIG. 3, the printing device 40 includes a RAM 41, a ROM 42, a CPU 43, an exclusive-use I/F 44, an external I/F 45, an operation panel 46, a HDD 47, and a plotter 48. These hardware elements are coupled to each other by a bus B2.

The RAM 41 is a volatile semiconductor memory configured to temporarily store programs and data. The ROM 42 is a non-volatile semiconductor memory that can store programs or data even when a power source is powered off. The CPU 43 is an arithmetic device that loads programs and/or data from the ROM 42 and the HDD 47 into the RAM 41, etc., and executes various processes.

The exclusive-use I/F 44 is an interface provided to couple the printing device 40 with the exclusive-use line 60. Thus, the printing device 40 can send and receive various kinds of data for synchronizing the sheet DB with the control device 30, via the exclusive-use I/F 44.

The external I/F 45 an interface between the printing device 40 and an external device. The external device includes a recording medium 45a, such as a CD, a DVD, a SD memory card, and a USB memory. The printing device 40 can read information from the recording medium 45a and write information to the recording medium 45a via the external I/F 45.

The operation panel 46 is an input output device including a touch panel for inputting various operations and a display for displaying various processing results.

The HDD 47 is a non-volatile memory device that stores programs and data. The programs and data stored in the HDD 47 are an OS, which is basic software controlling the entire printing device 40, and various application programs operating in the OS, etc.

The plotter 48 includes an image forming unit, and forms an output image on a print medium such as a sheet. The method of forming an output image is, for example, an electrophotographic method and an inkjet method, etc.

The printing device 40 according to the present embodiment can realize various processes described below by having the above hardware configuration illustrated in FIG. 3.

<Functional Configuration>

Figure 4:
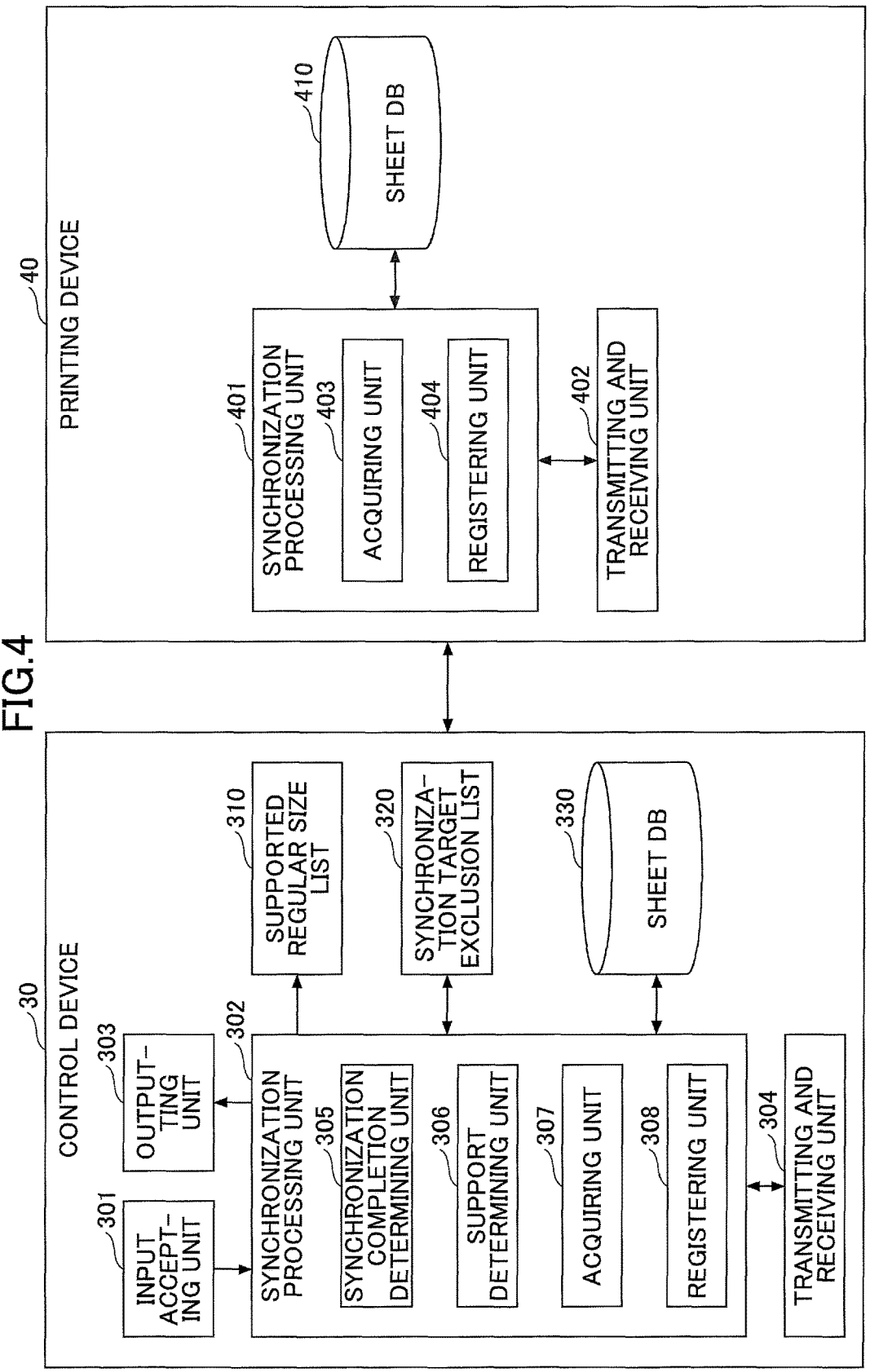
FIG. 4 illustrates an example of a functional configuration of the control device and the printing device according to an embodiment of the present invention.

Next, a description is given of a functional configuration of the control device 30 and the printing device 40 according to the present embodiment, by referring to FIG. 4. FIG. 4 illustrates an example of a functional configuration of the control device 30 and the printing device 40 according to the present embodiment.

As illustrated in FIG. 4, the control device 30 according to the present embodiment includes an input accepting unit 301, a synchronization processing unit 302, an outputting unit 303, and a transmitting and receiving unit 304. These functional units are realized by processes executed by the CPU 35 according to one or more programs installed in the control device 30.

Furthermore, the control device 30 according to the present embodiment includes a supported regular size list 310 and a synchronization target exclusion list 320. These lists are stored, for example, in the HDD 39, etc.

Furthermore, the control device 30 according to the present embodiment includes a sheet DB 330. The sheet DB 330 is realized by using, for example, the HDD 39, etc. Note that the sheet DB 330 may be realized by using a storage device, etc., coupled to the control device 30 via a network.

The input accepting unit 301 accepts inputs of various operations from a user. For example, when synchronizing the sheet DB 330 of the control device 30 and a sheet DB 410 of the printing device 40 described below with each other, the input accepting unit 301 accepts an operation of selecting either the sheet DB 330 or the sheet DB 410 as the DB to be used for the synchronization (that is, a selection of which DB is to be used as the synchronization source).

The synchronization processing unit 302 performs a process of synchronizing the sheet DB 330 of the control device 30 and the sheet DB 410 of the printing device 40 with each other, for example, in response to the activation, etc., of the image processing apparatus 10.

The outputting unit 303 outputs various screens. For example, the outputting unit 303 outputs, to the display device 32, a selection screen used by the user for performing an operation of selecting either the sheet DB 330 or the sheet DB 410 as the DB to be used as the synchronization source.

The transmitting and receiving unit 304 transmits and receives sheet data with the printing device 40, in order to synchronize the sheet DB 330 and the sheet DB 410 with each other. For example, the transmitting and receiving unit 304 receives sheet data stored in the sheet DB 410 of the printing device 40. Furthermore, for example, the transmitting and receiving unit 304 sends the sheet data to the printing device 40, when the sheet data is acquired from the sheet DB 330 by an acquiring unit 307 described below.

Here, the synchronization processing unit 302 includes a synchronization completion determining unit 305, a support determining unit 306, the acquiring unit 307, and a registering unit 308.

The synchronization completion determining unit 305 refers to the synchronization target exclusion list 320, and determines whether the sheet DB 330 and the sheet DB 410 are in synchronization with each other. Here, the synchronization target exclusion list 320 is a list of sheet data items that are not to be synchronized with the sheet DB 330 of the control device 30, among the sheet data items stored in the sheet DB 410 of the printing device 40.

Therefore, the synchronization completion determining unit 305 determines whether the sheet data items stored in the sheet DB 330 and the sheet data items stored in the sheet DB 410 match each other, excluding the sheet data items stored in the synchronization target exclusion list 320. Note that details of the synchronization target exclusion list 320 are described below.

The support determining unit 306 refers to the supported regular size list 310, and determines whether the sheet data received by the transmitting and receiving unit 304 (the sheet data stored in the sheet DB 410 of the printing device 40) is supported in the control device 30.

Here, the supported regular size list 310 stores data (supported regular size data) indicating the sheet class supported in the control device 30 (that is, the sheet class of the regular sheet size that can be used by the control device 30). A description is given of the supported regular size list 310 by referring to FIG. 5. FIG. 5 illustrates an example of the supported regular size list 310.

As illustrated in FIG. 5, in the supported regular size data stored in the supported regular size list 310, the sheet class indicating the name of the class of the regular size supported in the control device 30 and the sheet size of the corresponding sheet class are associated with each other. In this way, in the supported regular size list 310, the classes of regular sizes supported in the control device 30 are managed. Note that the supported regular size list 310 is, for example, created by the developer, etc., of the control device 30 in advance.

The acquiring unit 307 acquires the sheet data stored in the sheet DB 330, when the sheet DB 330 is selected as the synchronization source. Note that the sheet data acquired by the acquiring unit 307 is sent to the printing device 40 by the transmitting and receiving unit 304, as described above. Accordingly, the sheet DB 410 of the printing device 40 is synchronized with the sheet DB 330 of the control device 30.

The registering unit 308 synchronizes the sheet DB 410 of the sheet DB 410 with the sheet DB 330 of the control device 30, except for the sheet data that is determined as not being supported by the support determining unit 306, when the sheet DB 410 is selected as the synchronization source. That is, the registering unit 308 deletes the sheet data stored in the sheet DB 330, and then subsequently registers (stores), in the sheet DB 330, the sheet data determined as being supported by the support determining unit 306, among the sheet data received by the transmitting and receiving unit 304.

Here, the sheet DB 330 stores sheet data registered by the user of the control device 30. A description is given of the sheet DB 330 by referring to FIG. 6. FIG. 6 illustrates an example of the sheet DB 330 of the control device 30.

As illustrated in FIG. 6, the sheet DB 330 is a DB in which a maximum N number of sheet data items can be stored (registered). Furthermore, in the sheet data stored in the sheet DB 330, the sheet class indicating the name of the class of a regular size or an irregular size, the sheet size of the corresponding sheet class, the sheet type, and the sheet thickness, etc., are associated with each other. Note that in the sheet data stored in the sheet DB 330, for example, various attributes of the sheet may be associated with each other, such as color, gloss, and sheet conveying direction, etc., other than the above attributes.

As described above, in the sheet DB 330, the sheet data registered by the user of the control device 30 is managed. Note that the sheet type of the sheet data stored in the sheet DB 330 is not limited to paper; for example, the sheet type may be a cloth, a sheet material made of resin, plastic, copper foil, and prepreg, etc. That is, in the printing system 1 according to the present embodiment, the print medium is not limited to paper, but may be a cloth, a sheet material made of resin, plastic, copper foil, and prepreg, etc.

As illustrated in FIG. 4, the printing device 40 according to the present embodiment includes a synchronization processing unit 401 and a transmitting and receiving unit 402. These functional units are realized by processes executed by the CPU 43 according to one or more programs installed in the printing device 40.

Furthermore, the printing device 40 according to the present embodiment includes the sheet DB 410. The sheet DB 410 can be realized by using, for example, the HDD 47. Note that the sheet DB 410 may be realized by using, for example, a storage device, etc., coupled to the printing device 40 via a network.

The synchronization processing unit 401 performs a process of synchronizing the sheet DB 330 of the control device 30 and the sheet DB 410 of the printing device 40 with each other, for example, in response to the activation, etc., of the image processing apparatus 10.

The transmitting and receiving unit 402 transmits and receives sheet data with the control device 30, in order to synchronize the sheet DB 330 and the sheet DB 410 with each other. For example, the transmitting and receiving unit 402 sends sheet data acquired by an acquiring unit 403 described below, to the control device 30. Furthermore, for example, the transmitting and receiving unit 402 receives sheet data stored in the sheet DB 330 of the control device 30.

Here, the synchronization processing unit 401 includes the acquiring unit 403 and a registering unit 404. For example, the acquiring unit 403 acquires sheet data stored in the sheet DB 410, for example, in response to the activation, etc., of the image processing apparatus 10. When the sheet data (the sheet data stored in the sheet DB 330 of the control device 30) is received by the transmitting and receiving unit 402, the registering unit 404 deletes the sheet data in stored in the sheet DB 410, and then subsequently registers (stores) the sheet data received by the transmitting and receiving unit 402, in the sheet DB 410.

Here, in the sheet DB 410, sheet data that is registered by the user of the printing device 40 is stored. A description is given of the sheet DB 410 by referring to FIG. 7. FIG. 7 illustrates an example of the sheet DB 410 of the printing device 40.

As illustrated in FIG. 7, the sheet DB 410 is a DB in which a maximum M number of sheet data items can be stored (registered). Furthermore, in the sheet data stored in the sheet DB 410, various attribute values are associated with each other, such as the sheet class, the sheet size of the corresponding sheet class, the sheet type, and the sheet thickness, etc., similar to the sheet data stored in the sheet DB 330. As described above, in the sheet DB 410, the sheet data registered by the user of the printing device 40 is managed.

<Process Details>

Figure 8:
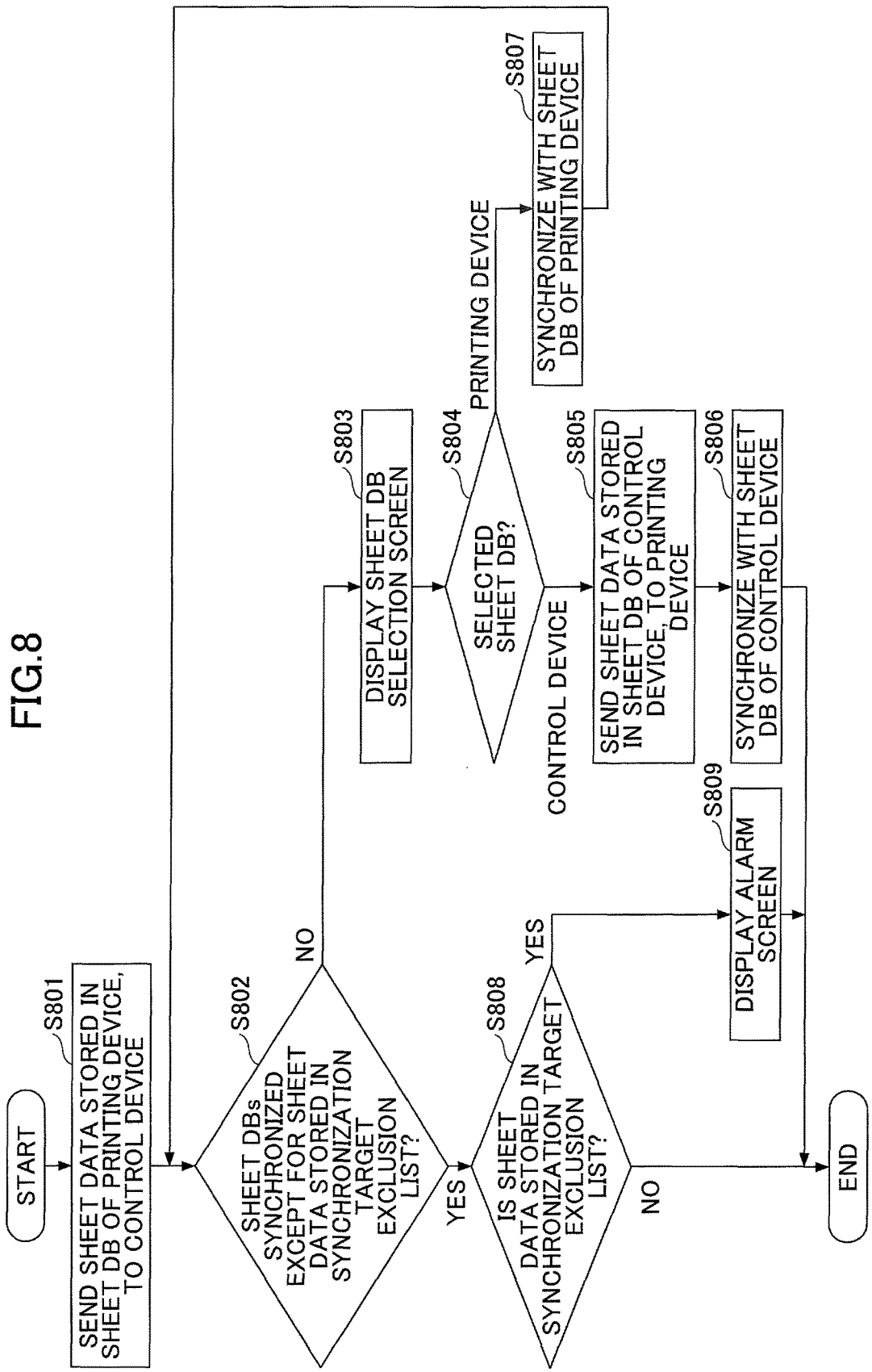
FIG. 8 illustrates an example of the overall process of synchronizing the sheet DBs of the control device and the printing device with each other, according to an embodiment of the present invention.

Next, a description is given of a process of synchronizing the sheet DB 330 of the control device 30 with the sheet DB 410 of the printing device 40 included the image processing apparatus 10 in the printing system 1 according to the present embodiment, by referring to FIG. 8. FIG. 8 illustrates an example of the overall process of synchronizing the sheet DBs of the control device 30 and the printing device 40 with each other.

First, for example, when the image processing apparatus 10 is activated, the acquiring unit 403 of the printing device 40 acquires all of the sheet data items stored in the sheet DB 410. Then, the transmitting and receiving unit 402 of the printing device 40 sends the sheet data items acquired by the acquiring unit 403, to the control device 30 (step S801).

Note that the activation of the image processing apparatus 10 may be performed, for example, as the user turns on the power of the control device 30 and the printing device 40. Furthermore, the image processing apparatus 10 may be activated, for example, as the user operates the terminal device 20.

Next, when the transmitting and receiving unit 304 receives the sheet data items, the synchronization completion determining unit 305 of the control device 30 determines whether the sheet DB 330 and the sheet DB 410 are synchronized with each other, except for the sheet data items stored in the synchronization target exclusion list 320 (step S802). That is, the synchronization completion determining unit 305 determines whether the sheet data items received by the transmitting and receiving unit 304 and the sheet data items stored in the sheet DB 330 match each other, except for the sheet data items stored in the synchronization target exclusion list 320.

Figure 9:
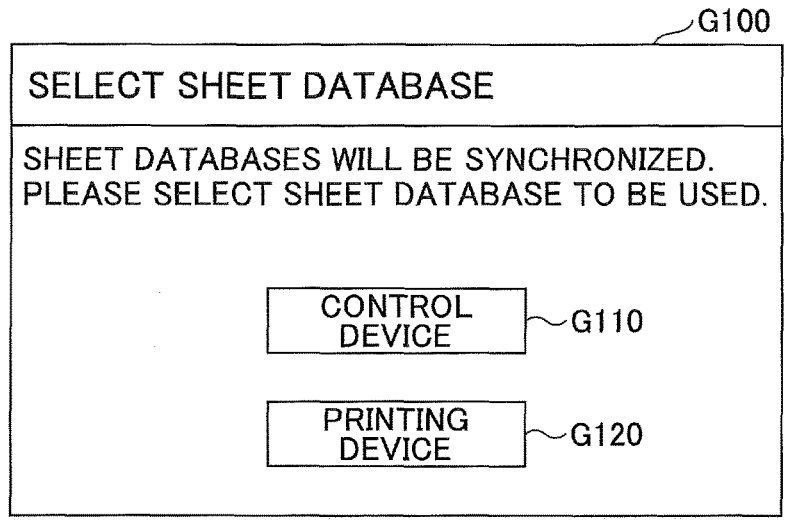
FIG. 9 illustrates an example of a sheet DB selection screen according to an embodiment of the present invention.

In step S802, when the synchronization completion determining unit 305 determines that the sheet DB 330 and the sheet DB 410 are not synchronized with each other, except for the sheet data items stored in the synchronization target exclusion list 320, the outputting unit 303 of the control device 30 outputs a sheet DB selection screen G100, for example, illustrated in FIG. 9, to the display device 32 (step S803).

Here, a description is given of the sheet DB selection screen G100 for selecting the sheet DB to be the synchronization source, by referring to FIG. 9. FIG. 9 illustrates an example of the sheet DB selection screen G100.

As illustrated in FIG. 9, the sheet DB selection screen G100 includes a selection button G110 for selecting the sheet DB 330 of the control device 30 as the synchronization source, and a selection button G120 for selecting the sheet DB 410 of the printing device 40 as the synchronization source. Accordingly, the user is able to select either the sheet DB 330 of the control device 30 or the sheet DB 410 of the printing device 40 as the synchronization source.

Note that in the printing system 1 according to the present embodiment, the sheet DB selection screen G100 illustrated in FIG. 9 is output to the display device 32 of the control device 30; however, the present embodiment is not so limited, and the sheet DB selection screen G100 may be output to, for example, a display device of the terminal device 20.

Next, the input accepting unit 301 of the control device 30 determines whether the sheet DB 330 of the control device 30 or the sheet DB 410 of the printing device 40 has been selected as the sheet DB to be the synchronization source, at the sheet DB selection screen G100 illustrated in FIG. 9 (step S804). That is, the input accepting unit 301 determines whether the selection button G110 or the selection button G110 has been selected, in the sheet DB selection screen G100 illustrated in FIG. 9.

In step S804, when the input accepting unit 301 determines that the sheet DB 330 has been selected as the synchronization source (that is, when the selection button G110 has been selected), the acquiring unit 307 of the control device 30 acquires all of the sheet data items stored in the sheet DB 330. Then, the transmitting and receiving unit 304 of the control device 30 sends the sheet data items acquired by the acquiring unit 307, to the printing device 40 (step S805).

Next, when the transmitting and receiving unit 402 receives the sheet data items (the sheet data items stored in the sheet DB 330 of the sheet DB 330), the registering unit 404 of the printing device 40 synchronizes the sheet DB 410 with the sheet DB 330 of the control device 30 (step S806).

Figure 10:
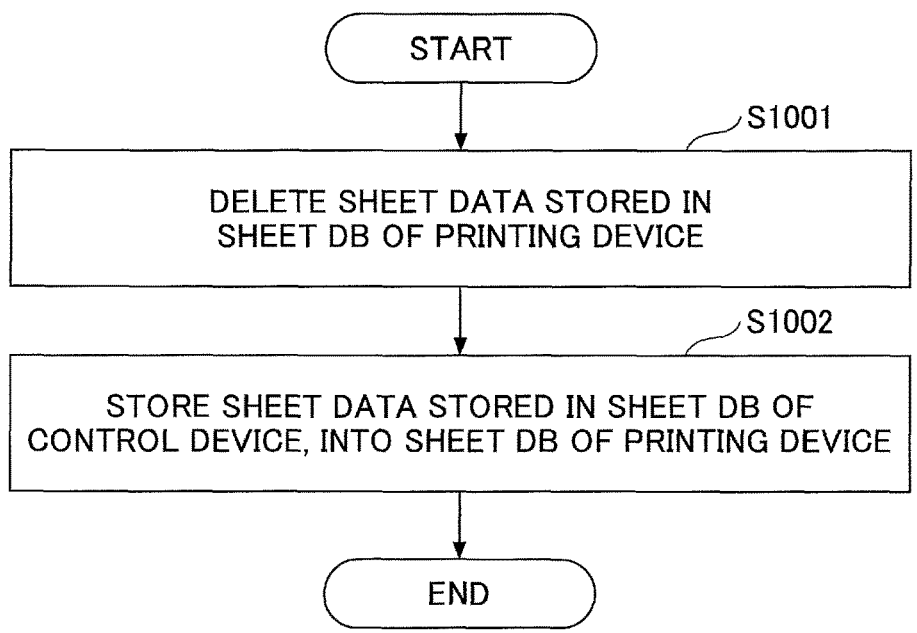
FIG. 10 illustrates an example of the process of using the sheet DB of the control device as the synchronization source to synchronize with the sheet DB of the printing device according to an embodiment of the present invention.

Here, a description is given of the synchronization process in step S806 described above (the process of using the sheet DB 330 of the control device 30 as the synchronization source to synchronize the sheet DB 330 and the sheet DB 410 with each other), by referring to FIG. 10. FIG. 10 illustrates an example of the process of using the sheet DB 330 of the control device 30 as the synchronization source to synchronize the sheet DB 330 and the sheet DB 410 of the printing device 40 with each other.

First, when the transmitting and receiving unit 402 receives sheet data items (the a sheet data items stored in the sheet DB 330 of the control device 30), the registering unit 404 of the printing device 40 deletes all of the sheet data items stored in the sheet DB 410 (step S1001).

Next, the registering unit 404 of the printing device 40 registers (stores) the sheet data items received by the transmitting and receiving unit 402, in the sheet DB 410 (step S1002). Accordingly, the sheet data items stored in the sheet DB 330 of the control device 30 are registered in the sheet DB 410 of the printing device 40. That is, the sheet DB 330 of the control device 30 is used as the synchronization source to synchronize the sheet DB 330 and the sheet DB 410 of the printing device 40 with each other.

Referring back to FIG. 8, in step S804, when the input accepting unit 301 determines that the sheet DB 410 has been selected as the synchronization source (that is, when the selection button G120 has been selected), the registering unit 308 of the control device 30 synchronizes the sheet DB 330 with the sheet DB 410 of the printing device 40 (step S807).

Figure 11:
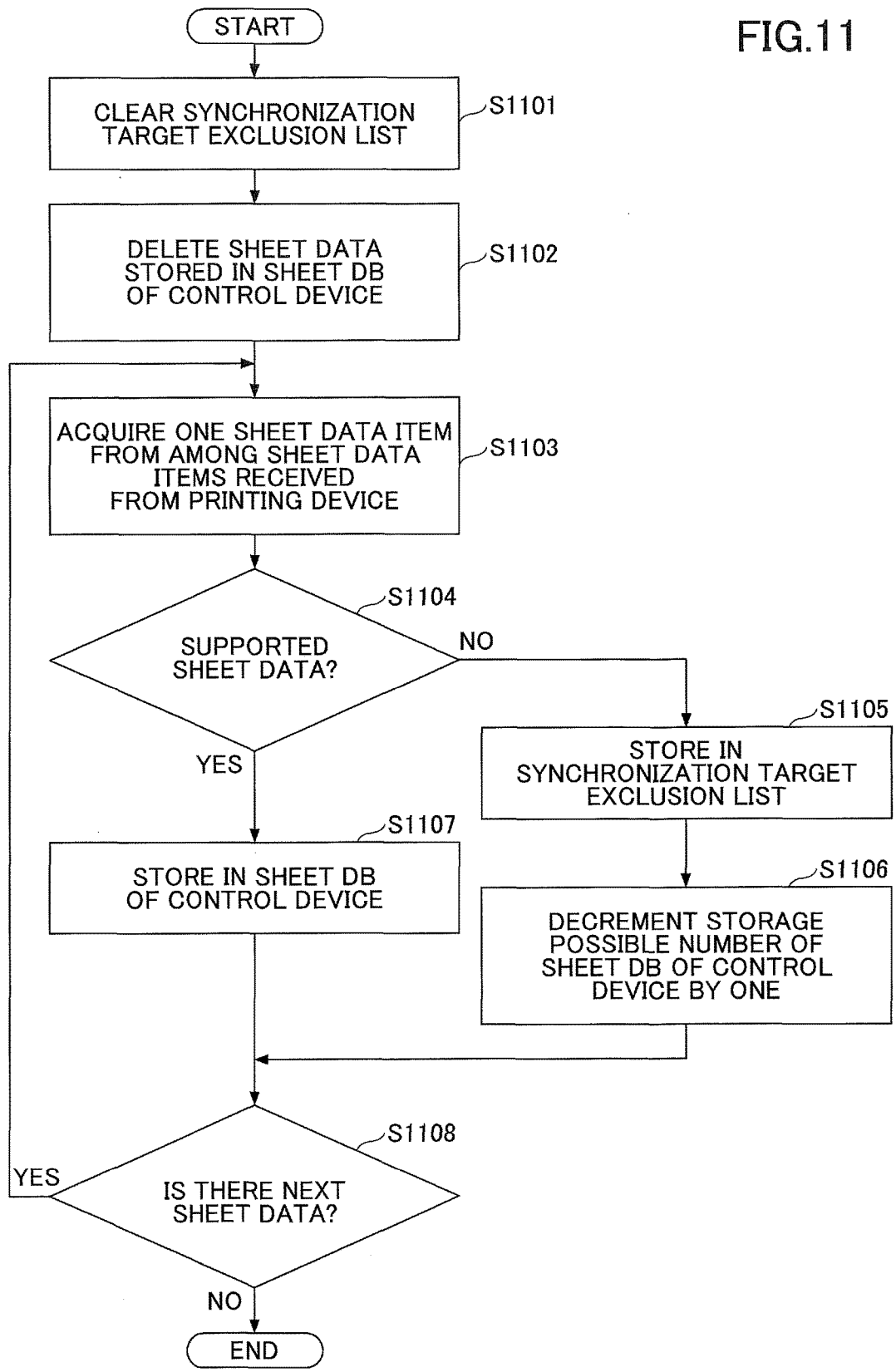
FIG. 11 illustrates an example of the process of using the sheet DB of the printing device as the synchronization source to synchronize with the sheet DB of the control device according to an embodiment of the present invention.

Here, a description is given of the synchronization process in step S807 described above (the process of using the sheet DB 410 of the printing device 40 as the synchronization source to synchronize the sheet DB 410 with the sheet DB 330 of the control device 30), by referring to FIG. 11. FIG. 11 illustrates an example of the process of using the sheet DB 410 of the printing device 40 as the synchronization source to synchronize the sheet DB 410 and the sheet DB 330 of the control device 30 with each other.

First, the registering unit 308 of the control device 30 clears the synchronization target exclusion list 320 (step S1101). That is, the registering unit 308 deletes all of the sheet data items stored in the synchronization target exclusion list 320.

Next, the registering unit 308 of the control device 30 deletes all of the sheet data items stored in the sheet DB 330 (step S1102).

Next, the registering unit 308 of the control device 30 acquires one sheet data item, from among the sheet data items received by the transmitting and receiving unit 304 (the sheet data items stored in the sheet DB 410 of the printing device 40) (step S1103).

Next, the support determining unit 306 of the control device 30 refers to the supported regular size list 310, and determines whether the sheet data item acquired in step S1103 is supported (step S1104). That is, the support determining unit 306 determines whether the sheet class and the sheet size included in the sheet data item acquired in step S1103 are stored in the supported regular size list 310 as supported regular size data.

For example, it is assumed that the sheet class and the sheet size included in the sheet data item acquired in step S1103 are "regular size A3" and "4200×2970", respectively. In this case, the supported regular size data of the sheet class and the sheet size is stored in the supported regular size list 310, and therefore the support determining unit 306 determines that the sheet data is supported.

On the other hand, for example, it is assumed that the sheet class and the sheet size included in the sheet data item acquired in step S1103 are "regular size C5" and "2290×1620", respectively. In this case, the supported regular size data of the sheet class and the sheet size is not stored in the supported regular size list 310, and therefore the support determining unit 306 determines that the sheet data item is not supported.

In step S1104, when the support determining unit 306 determines that the sheet data item is not supported, the registering unit 308 of the control device 30 stores the sheet data item in the synchronization target exclusion list 320 (step S1105).

Figures 12, 13:
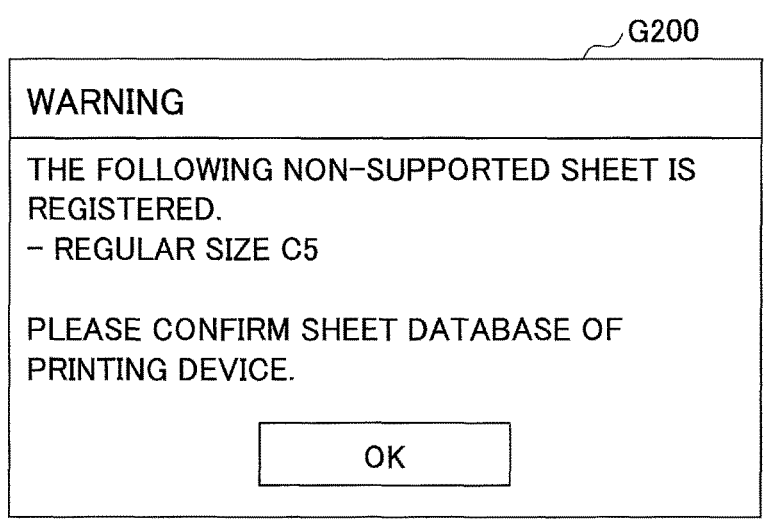
FIG. 12 illustrates an example of a synchronization target exclusion list according to an embodiment of the present invention.
FIG. 13 illustrates an example of an alarm screen according to an embodiment of the present invention.

Here, a description is given of the synchronization target exclusion list 320, by referring to FIG. 12. FIG. 12 illustrates an example of the synchronization target exclusion list 320.

As illustrated in FIG. 12, the sheet data items, which are not supported in the control device 30 among the sheet data items stored in the sheet DB 410, are stored in the synchronization target exclusion list 320, in a case where the sheet DB 410 is the synchronization source. That is, the synchronization target exclusion list 320 stores the sheet data items, which do not include the sheet class and the sheet size stored in the supported regular size list 310, among the sheet data items that are stored in the sheet DB 410 that is the synchronization source.

Next, the registering unit 308 of the control device 30 decrements the number of sheet data items that can be registered in the sheet DB 330 (registration possible number) by one (step S1106). That is, for example, when the registration possible number of the sheet DB 330 is N, the registering unit 308 sets the registration possible number of the sheet DB 330 as N−1. Note that, for example, the registering unit 308 may decrement the registration possible number, by setting an area that does not store any sheet data in the sheet DB 330, as an area that cannot be used.

On the other hand, in step S1104, when the support determining unit 306 determines that the sheet data item is supported, the registering unit 308 registers (stores) the sheet data item acquired in step S1103, in the sheet DB 330 (step S1107).

Next, the registering unit 308 of the control device 30 determines whether there is a next sheet data item, in the sheet data items received by the transmitting and receiving unit 304 (sheet data items stored in the sheet DB 410 of the printing device 40) (step S1108). That is, when the registering unit 308 acquires a sheet data item having an ID that is m (1≤m≤M) in step S1103, among the sheet data items received by the transmitting and receiving unit 304, the registering unit 308 determines whether there is a sheet data item having an ID that is m+1.

In step S1108, when the registering unit 308 determines that there is a next sheet data item, the control device 30 returns to step S1103. On the other hand, in step S1108, when the registering unit 308 determines that there is no next sheet data item, the control device 30 ends the synchronization process.

Accordingly, the sheet data items stored in the sheet DB 410 of the printing device 40 are registered in the sheet DB 330 of the control device 30, except for the sheet data items corresponding to the sheet class and sheet size stored in the synchronization target exclusion list 320. Said differently, among the sheet data items stored in the sheet DB 410 of the printing device 40, the sheet data items supported in the control device 30 are registered in the sheet DB 330.

Referring back to FIG. 8, in step S802, when the synchronization completion determining unit 305 determines that the sheet DB 330 and the sheet DB 410 are synchronized with each other, except for the sheet data items stored in the synchronization target exclusion list 320, the registering unit 308 of the control device 30 determines whether there is any sheet data stored in the synchronization target exclusion list 320 (step S808).

In step S808, when the registering unit 308 determines that there is sheet data stored in the synchronization target exclusion list 320, the outputting unit 303 of the control device 30 outputs, for example, an alarm screen G200 illustrated in FIG. 13, to the display device 32 (step S809).

Here, a description is given of the alarm screen G200 displayed on the display device 32 when there is sheet data stored in the synchronization target exclusion list 320, by referring to FIG. 13. FIG. 13 illustrates an example of the alarm screen G200.

As illustrated in FIG. 13, the alarm screen G200 displays the sheet class included in the sheet data item stored in the synchronization target exclusion list 320. Accordingly, the user of the image processing apparatus 10 is able to recognize that the sheet data items are synchronized between the sheet DB 330 of the control device 30 and the sheet DB 410 of the printing device 40, except for the sheet data items stored in the synchronization target exclusion list 320. Said differently, the user of the image processing apparatus 10 is able to recognize that the sheet data of the sheet class and the sheet size that are not supported in the control device 30, is stored in the sheet DB 410 of the printing device 40.

Therefore, for example, the user is able to delete the sheet data that is not supported in the control device 30, upon confirming the sheet data stored in the sheet DB 410 of the printing device 40.

<Overview>

As described above, the printing system 1 according to the present embodiment is able to synchronize the sheet DB 330 and the sheet DB 410 with each other, between the control device 30 and the printing device 40 included in the image processing apparatus 10.

At this time, the image processing apparatus 10 according to the present embodiment synchronizes the sheet DB 330 and the sheet DB 410 with each other by storing the sheet data in the sheet DB 330 into the sheet DB 410, when the sheet DB 330 is the synchronization source.

On the other hand, when the sheet DB 410 is the synchronization source, the image processing apparatus 10 according to the present embodiment stores the sheet data items supported in the control device 30 among the sheet data items in the sheet DB 410, into the sheet DB 330, to synchronize the sheet DB 330 and the sheet DB 410 with each other. Furthermore, the image processing apparatus 10 according to the present embodiment stores the sheet data items that are not supported in the control device 30 among the sheet data items in the sheet DB 410, into the synchronization target exclusion list 320, to exclude these sheet data items from the target of determination of synchronization between the sheet DB 330 and the sheet DB 410 (step S802 of FIG. 8).

Accordingly, the printing system 1 according to the present embodiment is able to appropriately synchronize the sheet data between the control device 30 and the printing device 40 included in the image processing apparatus 10, except for the sheet data that is not supported in the control device 30.

Note that the synchronization completion determining unit 305 is an example of the first determiner. The support determining unit 306 is an example of the second determiner. The registering unit 308 is an example of the storer. The synchronization target exclusion list 320 is an example of the first storage. The outputting unit 303 is an example of the display controller. The transmitting and receiving unit 304 is an example of the receiver. The input accepting unit 301 is an example of the acceptor. The supported regular size list 310 is an example of the second storage.

According to one embodiment of the present invention, the print medium databases can be appropriately synchronized with each other.

The information processing apparatus, the information processing system, and the information processing method are not limited to the specific embodiments described in the detailed description, and variations and modifications may be made without departing from the spirit and scope of the present invention.

What is claimed is:

1. An information processing apparatus including a first print medium database storing one or more first print medium data items indicating one or more attributes of a print medium, the information processing apparatus being coupled to a printing device including a second print medium database storing one or more second print medium data items, the information processing apparatus comprising:

processing circuitry configured to
determine whether the first print medium database and the second print medium database are synchronized with each other,
determine whether the one or more second print medium data items stored in the second print medium database are supported in the information processing apparatus, when the first print medium database and the second print medium database are determined as not being synchronized with each other, and delete the one or more first print medium data items stored in the first print medium database, and subsequently store, in the first print medium database, at least one of the second print medium data items that is determined as being supported in the information processing apparatus among the one or more second print medium data items stored in the second print medium database.

2. The information processing apparatus according to claim 1, wherein the processing circuitry is further configured to determine whether the first print medium database and the second print medium database are synchronized with each other except for at least one of the second print medium data items that is determined as not being supported in the information processing apparatus, when the at least one of the second print medium data items supported in the information processing apparatus has been stored in the first print medium database.

3. The information processing apparatus according to claim 2, wherein the processing circuitry is further configured to
store, in a first storage, the at least one of the second print medium data items determined as not being supported in the information processing apparatus, and
display a predetermined attribute included in the at least one of the second print medium data items stored in the first storage, when the first print medium database and the second print medium database are determined as being synchronized with each other.

4. The information processing apparatus according to claim 1, wherein the processing circuitry is further configured to
receive the one or more second print medium data items stored in the second print medium database from the printing device, and
determine that the first print medium database and the second print medium database are synchronized with each other, when the received one or more second print medium data items and the one or more first print medium data items stored in the first print medium database match each other.

5. The information processing apparatus according to claim 4, wherein the processing circuitry is further configured to receive the one or more second print medium data items that are sent in response to activation of the printing device.

6. The information processing apparatus according to claim 1, wherein the processing circuitry is further configured to
accept a selection to select either the first print medium database or the second print medium database as a synchronization source, when the first print medium database and the second print medium database are determined as not being synchronized with each other, and determine whether the one or more second print medium data items stored in the second print medium database are supported in the information processing apparatus, when the selection indicating to select the second print medium database as the synchronization source is accepted.

7. The information processing apparatus according to claim 1, wherein the processing circuitry is further configured to
store, in a second storage, medium class data indicating one or more print medium data items supported in the information processing apparatus, and
determine that the one or more second print medium data items are supported in the information processing apparatus, when the medium class data, which indicates the one or more second print medium data items stored in the second print medium database, is stored in the second storage.

8. An information processing system including an information processing apparatus including a first print medium database storing one or more first print medium data items indicating one or more attributes of a print medium, and a printing device including a second print medium database storing one or more second print medium data items, the information processing system comprising:
processing circuitry configured to
determine whether the first print medium database and the second print medium database are synchronized with each other,
determine whether the one or more second print medium data items stored in the second print medium database are supported in the information processing apparatus, when the first print medium database and the second print medium database are determined as not being synchronized with each other, and
delete the one or more first print medium data items stored in the first print medium database, and subsequently store, in the first print medium database, at least one of the second print medium data items that is determined as being supported in the information processing apparatus among the one or more second print medium data items stored in the second print medium database.

9. An information processing method executed by a computer in an information processing system including an information processing apparatus including a first print medium database storing one or more first print medium data items indicating one or more attributes of a print medium, and a printing device including a second print medium database storing one or more second print medium data items, the information processing method comprising:
determining whether the first print medium database and the second print medium database are synchronized with each other;
determining whether the one or more second print medium data items stored in the second print medium database are supported in the information processing apparatus, when the first print medium database and the second print medium database are determined as not being synchronized with each other; and
deleting the one or more first print medium data items stored in the first print medium database, and subsequently storing, in the first print medium database, at least one of the second print medium data items that is determined as being supported in the information processing apparatus among the one or more second print medium data items stored in the second print medium database.

* * * * *